April 15, 1941.  E. L. SHEPARD  2,238,853

METHOD OF MAKING PULP MOLDING DIES

Original Filed Aug. 24, 1938

INVENTOR.
Ernest L. Shepard
BY Spear, Rawlings & Spear
ATTORNEYS.

Patented Apr. 15, 1941

2,238,853

UNITED STATES PATENT OFFICE 2,238,853

METHOD OF MAKING PULP MOLDING DIES

Ernest L. Shepard, Fairfield, Maine, assignor, by mesne assignments, to The Canal National Bank of Portland, Portland, Maine, as trustee, a national-banking association Original application August 24, 1938, Serial No. 226,507, now Patent No. 2,192,937, dated March 12, 1940. Divided and this application March 9, 1939, Serial No. 260,731

3 Claims. (Cl. 76—107)

This invention relates to the manufacture of pulp molding dies of the type which are provided with a drainage surface of wire mesh and particularly the dies described and claimed in Patent No. 2,192,937, dated March 12, 1940, of which this application is a division.

Such dies, as explained in said copending application, are especially designed for the manufacture of relatively large flat articles such as one having a surface contour comprising a series of alternating upwardly and downwardly extending posts with steep side wall angles and relatively sharp corners, as for example, the combination flat and filler shown in the Kronenberger Patent No. 1,956,955, dated May 1, 1934.

In making a die for the manufacture of an article of such large area and irregular contour, it is difficult, if not impossible, to draw or shape a single piece of wire mesh to fit the entire working surface of the molding die without either distorting or breaking the mesh to such an extent as to change its drainage characteristic and cause mechanical weaknesses at certain sections of its area. To avoid these difficulties, such articles heretofore have been manufactured on dies which do not require a woven wire covering on their working surfaces, such as a laminated die.

My present invention contemplates the production of a die which has a sectional molding surface, the woven wire covering for which is made up of pieces conforming in contour and size to each molding section. When the die sections and their wire coverings are assembled according to my method, the wire covering sections are held securely to the working surface of the mold sections by clamping the marginal edges of the wire sections between abutting edges of the mold sections. Compared with dies of laminated type, my method produces a die of reduced weight, lower manufacturing costs and longer life, with lower maintenance.

In the accompanying drawing I have illustrated a die made according to my method and have indicated the several steps thereof. In the drawing.

Figure 4:
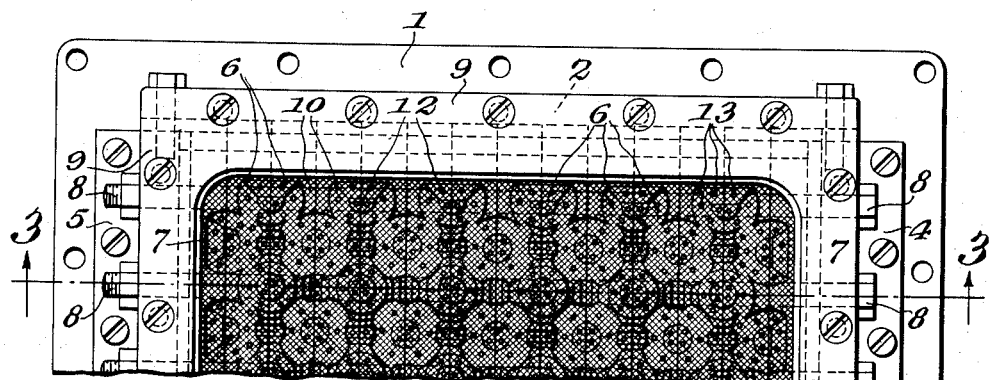
Fig. 4 is a fragmentary top plan view of a die made up of an assembly of mold sections and their conforming wire coverings.

According to my method, the mold is made up of a plurality of wire covered mold sections 6 and 7. These sections and their coverings are clamped in edgewise abutment between the end plates 4 and 5 of a die frame 1 by means of clamping bolts 8 and an overlying clamping ring 9. The ring 9 defines the edge of the molded article and, as shown, also serves to hold the clamped mold sections securely within the die frame 1. The die frame has side walls, one of which is shown and designated at 2 in Fig. 4, and end plates 4 and 5. The end plates 4 and 5 are bolted in place by suitable bolts or the like 8. If desired, one of said end plates here shown as plate 4, may be an integral part of the frame 1. The opposite plate 5 is a removable clamping member.

Each mold section 6 and 7 is provided with its own preformed wire mesh covering 10. Each wire mesh covering conforms in size and contour to the size and contour of the working surface 12 of the mold section which it covers, the mold sections being perforated as at 13 for drainage into the underlying vacuum chamber 14.

Figure 1:
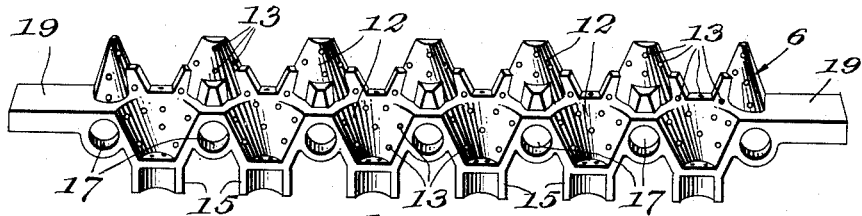
Fig. 1 is a perspective view of one of the mold sections of my die.
Figure 2:
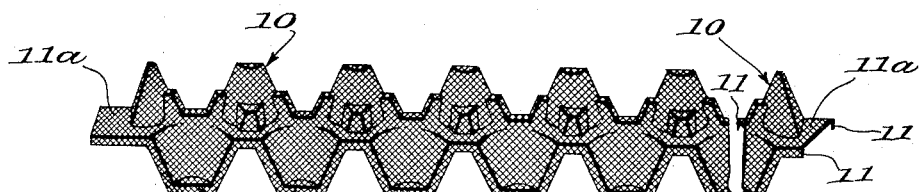
Fig. 2 is a similar view of a conforming wire covering for such mold section.
Figure 3:
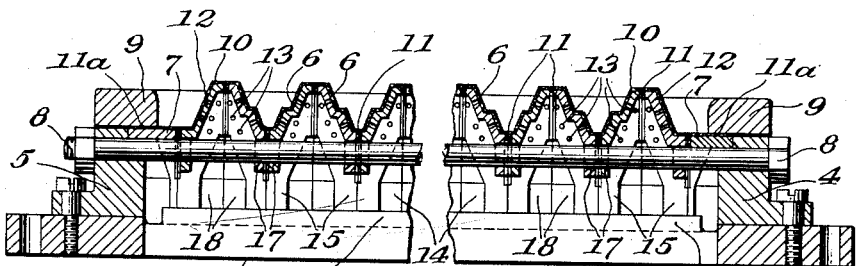
Fig. 3 is a section on the line 3—3 of Fig. 4.

The longitudinal edges of each wire mesh cover section are extended as at 11 sufficiently to permit them to be clamped between the abutting edges of two adjacent mold sections. Each end of the wire mesh covering is extended as at 11a sufficiently to permit said ends to be clamped between the ring 9 and the mold section which is covered by said wire cover. As shown in Fig. 1, the design is such that one abutting edge of each mold section and one turned-down marginal portion of its covering intersects substantially the highest plane of the die and the other abutting edge of each mold section and the other turned-down marginal portion of its covering intersects substantially the adjacent lowest plane of the die. The breaking up of the contour of the die into sections in this manner permits forming of a fitting wire mesh covering for each mold section (see Fig. 2) due to the fact that each wire mesh covering may be conformed to its mold section without excessive "drawing" or distortion. To place the wire mesh coverings over their respective mold sections or to remove the same, it is only necessary to remove the ring 9, loosen the clamp bolts 8 and loosen the clamp member 5 from the frame 1.

The sections 6 and 7 making up the mold surface of the die may then be spread apart and the wire coverings added to or taken from the mold sections as required. After the wire coverings are in place, the clamp piece 5 is replaced in its assembled position, once again clamping the mold sections with their wire coverings securely in place, and the ring 9 added completing the die assembly.

Each mold section may be provided with reinforcing posts 15 resting on supports 16 which may be a part of the frame 1. The clamping bolts 8 pass through holes 17 in the mold sections, and the mold sections are provided with lugs 18 adapted for clamping abutment with similar lugs on an adjacent mold section. The end mold sections 7 are generally similar to the intermediate mold sections 6 except for differences in contour, and the ends of the mold sections are laterally extended as at 19 to laterally position the mold sections with reference to each other and to the die frame.

Several methods of constructing my die are possible. According to one method, all parts making up the same are separately finished except for the finishing of the contour of the working surface of the mold sections. The die is then assembled as heretofore described, except for applying the woven wire coverings over the mold sections, and shims substantially equal to the thickness of the abutting longitudinal edges of the wire coverings, are inserted between the mold sections in lieu of the wire coverings and are clamped between the wire clamping longitudinal edges of the mold sections.

In this assembled condition, the die is ready to have the final contour of the working surface of the mold sections finished. This may be done in any suitable manner, as for instance on a die sinking machine from a master of the required shape. After finishing the contour of the mold sections, the drainage holes 13 may be drilled, after which the shims are removed and the wire coverings assembled on the molding surface as heretofore described.

If desired, the shims may be omitted in the above die assembly, and the contour finished as required, the mold sections then being disassembled from the die and the wire clamping abutting edges of each mold section relieved an amount approximately equal to the thickness of the extended edges 11 of the wire coverings.

While I have described the mold sections as being machine finished, it will be apparent to one skilled in the art that mold sections, such as shown in Fig. 1 may be die-cast or with slight modifications in design formed from sheet stock where a sufficient number of similar sections are wanted to warrant the expense of this practice.

While I have shown and described the coverings for the mold sections as made of woven wire, it will be understood that this may be any other suitable material, such as thin perforate metal.

Various other modifications in the method of making dies of the type described may be resorted to without departing from the spirit of the invention, if within the limit of the appended claims.

What I therefore claim and desire to secure by Letters Patent is:

1. In the method of making a pulp molding die the working surface of which comprises a plurality of edgewise abutting perforate mold sections and individual conforming perforate coverings clamped between abutting edges of said mold sections, the steps which comprise separately finishing all parts making up the die assembly except for the final finishing of the working surface of the mold sections, clamping said die parts as an assembled unit in their proper relationship but with shims inserted between the abutting covering-clamping edges of the mold sections in lieu of the perforate coverings for said mold sections, finishing the contour of the working surface of the die while the die parts are thus clamped, independently forming the individual perforate coverings to the size and contour of the mold sections in readiness for clamping the same between the abutting covering-clamping edges of said mold sections, releasing the clamped mold section assembly, removing the shims, inserting the formed perforate coverings, and re-assembling the die unit with the marginal edges of the perforate coverings tightly clamped between the abutting covering-clamping edges of the mold sections.

2. The method of claim 1, the perforate coverings being formed with turned marginal flanges for clamping between the abutting covering-clamping edges of the mold sections.

3. In the method of making a pulp molding die the working surface of which comprises a plurality of edgewise abutting perforate mold sections and individual conforming perforate coverings clamped between abutting edges of said mold sections, the steps which comprise separately finishing all parts of the die assembly except for the final finishing of the working surface of the mold sections and for relieving the abutting covering-clamping edges of the mold sections to allow for the thickness of the coverings, clamping said die parts as an assembled unit in their proper relationship, finishing the contour of the working surface of the die while the die parts are thus clamped, independently forming the individual perforate coverings to the size and contour of the mold sections in readiness for clamping the same between the abutting covering-clamping edges of said mold sections, disassembling the clamped mold section assembly, relieving the abutting covering-clamping edges of the mold sections a thickness approximately equal to the thickness of the extended edges of the coverings, and re-assembling the sectional working surface, inserting the formed perforate coverings with their marginal edges tightly clamped between the abutting covering-clamping edges of said mold sections.

ERNEST L. SHEPARD.